United States Patent
Judd

[11] 3,714,225
[45] Jan. 30, 1973

[54] ESTERS OF BICYCLIC AMINOALCOHOLS

[75] Inventor: Claude I. Judd, Mequon, Wis.

[73] Assignee: Colgate-Palmolive Company, New York, N.Y.

[22] Filed: Aug. 18, 1965

[21] Appl. No.: 481,447

[52] U.S. Cl. ........... 260/473 A, 260/468 R, 260/469, 260/477, 260/484 R, 260/490, 260/563 P, 260/570.8 TC, 260/999, 424/299

[51] Int. Cl. .............................................. C07c 69/76

[58] Field of Search ...... 260/468, 469, 473, 484, 488, 260/490, 468 R, 473 A, 477, 478, 484 R; 167/65

[56] References Cited

UNITED STATES PATENTS 3,124,594  3/1964  Bolger ............................... 167/65 X Primary Examiner—Leland A. Sebastian
Attorney—T. F. Kryshak and M. L. Youngs

EXEMPLARY CLAIM

1. A compound selected from the group consisting of compounds of the formula

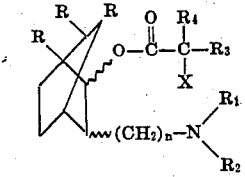

wherein R is hydrogen or methyl, $R_1$ and $R_2$ are hydrogen, lower alkyl, aryl and aralkyl, $R_3$ and $R_4$ are lower alkyl, cycloalkyl or aryl, X is hydrogen or hydroxyl and $n$ is zero or one, and pharmaceutically acceptable salts thereof.

9. 2-benzilyloxy-3(N,N-dimethylaminomethyl)bicyclo-[2.2.1]heptane.

16 Claims, No Drawings

ESTERS OF BICYCLIC AMINOALCOHOLS

This invention relates to novel bicyclic compounds. More particularly, it relates to novel esters of bicyclic amino alcohols and non-toxic pharmaceutically acceptable salts thereof.

The compounds of the present invention may be represented by the following formula

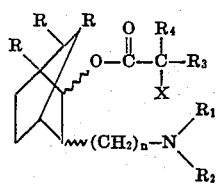

wherein R is hydrogen or methyl, $R_1$ and $R_2$ are hydrogen, lower alkyl such as methyl, isopropyl or butyl, aralkyl such as benzyl, or aryl such as phenyl and halogen substituted phenyl, $R_3$ and $R_4$ are lower alkyl, cycloalkyl such as cyclopentyl or cyclohexyl, or aryl such as phenyl or halogen substituted phenyl, X is hydrogen or hydroxyl and $n$ is zero or one. The wavy bond lines indicate that the compound may exist in the form of stereoisomers in which the substituents are cis (exo) or trans (endo) to the methylene bridge.

The compounds of the invention may preferably be prepared by treating a bicyclic aminoalcohol with an ester of a desired acid, such as a lower alkyl ester, preferably in the presence of an alkaline catalyst, such as sodium or sodium methoxide. This reaction may be represented as follows:

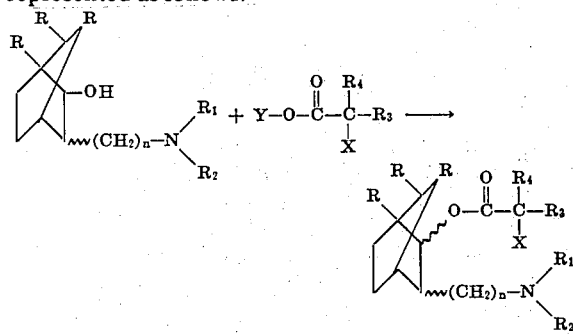

in which Y is a lower alkyl of one to four carbon atoms and all other symbols have their previously assigned values.

Representative acids which may be used in the process in the form of suitable esters are benzilic acid, diphenylacetic-acid and the like. Generally, such compounds are used in the process in the form of esters of lower alcohols such as methanol, ethanol, propanol and the like.

Representative of the bicyclic amino alcohols which can be employed are the following:

2-hydroxy-3(N,N-dimethylaminomethyl)bicyclo[2.2.1]-heptane, 2-hydroxy-3(N,N-dibenzylaminomethyl)bicyclo[2.2.1]-heptane, 2-hydroxy-3(N-benzylaminomethyl)bicyclo[2.2.1]-heptane, and 1,7,7-trimethyl-2-hydroxy-3-dimethylaminobicyclo[2.2.1]heptane.

Suitable solvents for use in carrying out the reaction are n-heptane, methylcyclohexane and xylene. Elevated temperatures are generally employed and reflux conditions are preferred. The reaction can be induced to go to substantial completion in a minimum of time by removing the alcoholic by-product which is formed. After the theoretical amount of alcohol is collected the reaction may be considered complete. The desired ester is conveniently recovered from the mixture by conventional means, e.g., fractional distillation.

Representative of the novel esters which may be prepared are the following:

2-benzilyloxy-3(N,N-dimethylaminomethyl)bicyclo-[2.2.1]heptane, 2-benzilyloxy-3(N,N-dibenzylaminomethyl)bicyclo-[2.2.1]heptane, 2-(phenylcyclopentylhydroxyacetoxy)-3(N,N-dimethyl-aminomethyl)bicyclo[2.2.1]heptane, and 2-benzilyloxy-3-aminomethyl-bicyclo[2.2.1]heptane, and 1,7,7-trimethyl-2-benzilyloxy-3-N,N-dimethylamino-bicyclo[2.2.1]heptane.

The bicyclic amino alcohols employed as starting materials may be prepared by the chemical or catalytic reduction of a corresponding bicyclic amino ketone. The process may be represented as follows:

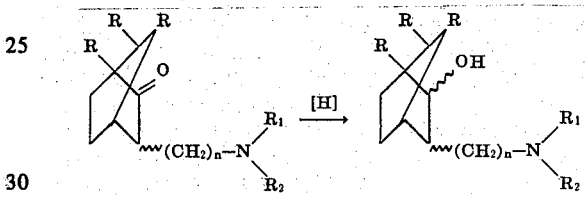

The chemical reduction of the ketone to the alcohol, for example, using lithium aluminum hydride as the reducing agent may be readily effected by combining the reactants in an inert anhydrous organic solvent such as ether, dioxane or tetrahydrofuran, preferably at reflux temperatures. When the reaction is substantially complete, usually in 1 to 8 hours, water is added to the reaction mixture to decompose the excess reducing agent and the desired alcohol is recovered by conventional means.

The catalytic reduction of the ketone to the corresponding alcohol may be conveniently effected in aqueous alcohol solutions in the presence of platinum or palladium catalysts, hydrogen pressures of about 40 to 60 psi. and temperatures from room temperature to about 50° C. The desired alcohol may be recovered from the reaction mixture by conventional means.

The bicyclic amino ketones, used to prepare the alcohols, are prepared by refluxing bicyclo[2.2.1]heptan-2-one with an appropriate secondary amine and a suitable aldehyde such as formaldehyde. Preferably, the reaction is conducted in an aqueous medium and in the presence of a suitable acid, e.g., hydrochloric acid. (See U.S. Pat. No. 3,153,039.)

The novel esters form acid addition salts with organic and inorganic acids such as hydrochloric acid, sulfuric acid, phosphoric acid and the like. In addition, they form quaternary salts with quaternizing agents such as methyl bromide, benzyl chloride and the like.

The compounds of the invention, as well as their pharmaceutically acceptable salts, are promising psychopharmacologic agents, antispasmodics, antiparkinsonian agents and local anesthetics. These compounds may also be used as intermediates in the preparation of more complex chemical and pharmaceutical agents.

The compounds can be administered to animals as pure compounds, as the bases, or in the form of pharmaceutically acceptable salts. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as propylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined amount of one or more of the active ingredients as a non-toxic acid addition salt and may be administered one or more at a time at regular intervals. Such unit dosage forms, however, should generally contain a concentration of 0.1 to 10 percent by weight of one or more of the active agents. Such unit dosage forms should advisably contain about 5 to 150 mg. of the active ingredients.

A typical tablet may have the following composition:

| | |
|---|---|
| 1. 2-benzilyloxy-3(N,N-dimethyl-aminomethyl)bicyclo[2.2.1]-heptane | 10 |
| 2. Starch U.S.P. | 57 |
| 3. Lactose U.S.P. | 73 |
| 4 Talc U.S.P. | 9 |
| 5. Stearic acid | 6 |

Powders (1), (2) and (3) are slugged, then granulated, mixed with (4) and (5) and tableted.

Capsules may be prepared by filling No. 3 hard gelatin capsules with the following ingredients:

| | mg. |
|---|---|
| 1. 2-benzilyloxy-3(N,N-dimethyl-aminomethyl)bicyclo[2.2.1]-heptane | 20 |
| 2. Lactose U.S. P. | 200 |
| 3. Starch U.S.P. | 16 |
| 4. Talc U.S.P. | 8 |

The oral route is generally preferred for administering the compounds of this invention. However, other routes of administration such as parenteral may be employed.

The following examples are presented to illustrate this invention:

EXAMPLE 1

2-Hydroxy-3(N,N-dimethylaminomethyl)bicyclo [2.2.1]heptane

To a suspension of 7.8 g. lithium aluminum hydride in 100 ml. of tetrahydrofuran is added a solution of 10.9 g. 3(N,N-dimethylaminomethyl)bicyclo[2.2.1]heptan-2-one dissolved in 100 ml. tetrahydrofuran and the mixture is refluxed for 4 hours. The excess hydride is decomposed with 5 ml. of water and the complex is hydrolyzed with 17 ml. (40 percent) potassium hydroxide. The inorganic salts are removed by filtration and the filtrates dried over potassium carbonate. The product is collected by distillation to yield 4.4 g. of 2-hydroxy-3(N,N-dimethylaminomethyl)bicyclo[2.2.1]heptane, b.p. 115°–117° C.

The distillates are carefully refractionated through a 15 inch Stedman column under reduced pressure. Two fractions are obtained.

Fraction 1, 67° C. (1.0 mm.) is a liquid (17 percent).

Fraction 2, 92° C. (1.0 mm.) solidifies upon cooling.

exo-2-Hydroxy-exo-3(N,N-dimethylaminomethyl)bicyclo[2.2.1]-heptane percent).

Fraction 1 is converted to the hydrochloride salt using anhydrous hydrochloric acid in ether. Recrystallization from ethanol yields exo-2-hydroxy-exo-3(N,N-dimethylaminomethyl)bicyclo[2.2.1]heptane, m.p. 218°–219° C. Infrared hydrogen bonding studies indicate that the configuration of the hydroxyl group is exo to the aminomethyl bridge.

Anal. Calcd. for $C_{10}H_{20}ClNO$: C, 58.38; H, 9.80.

Found: C, 58.46; H, 9.81.

endo-2-Hydroxy-exo-3(N,N-dimethylaminomethyl)bicyclo[2.2.1]heptane

Fraction 2 is similarly converted to the hydrochloride salt and purified by recrystallization from acetonitrile to yield endo-2-hydroxy-exo-3(N,N-dimethylaminomethyl)bicyclo-[2.2.1]heptane, m.p. 222°–223° C.

Anal. Calcd. for $C_{10}H_{20}ClNO$: C, 58.38; H, 9.80.

Found: C, 58.46; H, 9.81.

EXAMPLE 2 endo-2-(Benzilyloxy)-exo-3(N,N-dimethylaminomethyl)bicyclo-[2.2.1]heptane hydrochloride A solution of 7.5 g. (0.0445 mole) endo-2-hydroxy-exo-3-(N,N-dimethylaminomethyl)bicyclo[2.2.1]heptane in 40 ml. dry benzene is added slowly to a mixture of 11.8 g. (0.0445 mole) α-chlorodiphenylacetyl chloride in 100 ml. dry benzene and the resulting mixture stirred at room temperature over night. The solids are removed by filtration and the filtrates evaporated under reduced pressure. The residues are dissolved in tetrahydrofuran and stirred with aqueous sodium bicarbonate at room temperature. The organic fraction is washed with saturated sodium chloride, dried, evaporated and the residues triturated in hot n-hexane. The solids which form on cooling are collected by filtration to yield the crude product, m.p. 62°–64° C. The solids are dissolved in anhydrous ethyl ether and acidified with anhydrous hydrogen chloride. The crude salt is recrystallized repeatedly from isopropanol to yield endo-2-(benzilyloxy)-exo-3(N,N-dimethylaminomethyl)bicyclo-[2.2.1]heptane hydrochloride, m.p. 147°–148° C.

Anal. Calcd. for $C_{24}H_{30}ClNO_3$: C, 69.29; H, 7.27; O, 11.54.

Found: C, 69.3; H, 7.4; O, 11.7.

EXAMPLE 3 exo-2-(Benzilyloxy)-exo-3(N,N,-dimethylaminomethyl)bicyclo-[2.2.1]heptane hydrochloride A mixture of 10.0 g. (0.059 mole) exo-2-hydroxy-exo-3-(N,N-dimethylaminomethyl)bicyclo[2.2.1]heptane, 14.3 g. (0.059 mole) methyl benzilate and 200 ml. n-heptane is heated in the presence of freshly prepared sodium methoxide until the separation of methanol in a Dean-Stark separator ceases (0.9 ml. of theory of 3.0 ml.). Upon cooling the reaction mixture is filtered and washed with water until the washes are neutral. The organic fraction is extracted with dilute hydrochloric acid whereupon a copious white precipitate forms. The solids are collected by filtration and recrystallized from isopropanol to yield exo-2-(benzilyloxy)-exo-3(N,N-dimethylaminomethyl)bicyclo[2.2.1]heptane hydrochloride, m.p. 198°–200° C.

Anal. Calcd. for $C_{24}H_{30}ClNO_3$: C, 69.29; H, 7.27; O, 11.54.

Found: C, 69.2; H, 7.3; O, 11.8.

EXAMPLE 4 endo-2-Hydroxy-exo-3(N,N-dibenzylaminomethyl)bicyclo[2.2.1]-heptane

A solution of 0.4 mole exo-3(N,N-dibenzylaminomethyl)-bicyclo[2.2.1]heptan-2-one in 350 ml. of tetrahydrofuran is added dropwise to a refluxing suspension of 0.4 mole lithium aluminum hydride in 350 ml. tetrahydrofuran and the resulting mixture is stirred at reflux for 4 hours. The excess hydride is decomposed with 10 ml. water, and the complex is hydrolyzed with 100 ml. 40 percent potassium hydroxide. The inorganic salts are removed by filtration, and the filtrates dried over anhydrous potassium carbonate. A mixture of isomers is obtained by distillation. The distillates are triturated in 100 ml. hexane and the solids collected by filtration and purified by recrystallization from 120 ml. hexane.

The pure product is dissolved in anhydrous ethyl ether and acidified with anhydrous hydrogen chloride. The solids which form are collected by filtration yielding a product which is recrystallized from ethyl acetate to yield endo-2-hydroxy-exo-3(N,N-dibenzylaminomethyl)bicyclo[2.2.1]heptane, m.p. 209°–211° C.

Anal. Calcd. for $C_{22}H_{28}ClNO$: C, 73.81; H, 7.88; N, 3.91; Cl, 9.90.

Found: C, 74.00; H, 8.04; N, 3.83; Cl, 9.72.

EXAMPLE 5 endo-2-Benzilyloxy-exo-3(N,N-dibenzylaminomethyl)bicyclo-[2.2.1]heptane hydrochloride A mixture of 32.1 g. (0.1 mole) endo-2-hydroxy-exo-3-(N,N-dibenzylaminomethyl)bicyclo[2.2.1]heptane, 24.2 g. (0.1 mole) methyl benzilate and 500 ml. n-heptane is heated to reflux in the presence of sodium methoxide until the separation of methanol in a Dean-Stark separator ceases. Upon cooling the reaction mixture is filtered and washed with water until the washes are neutral. The dried organic fractions are evaporated under reduced pressure to yield 50.0 g. (94 percent) of a heavy oil. The residues are dissolved in ethyl ether and acidified with anhydrous hydrogen chloride. The solids which form are collected by filtration to yield 58.5 g. of crude product, m.p. 120°–124° C. The crude product is purified by recrystallization from 300 ml. hot ethanol to yield endo-2-benzilyloxy-exo-3(N,N-dibenzylaminomethyl)bicyclo[2.2.1]heptane hydrochloride, m.p. 210°–211° C.

Anal. Calcd. for $C_{36}H_{38}ClNO_3$: c, 76.11; H, 6.74; N, 2.47; Cl, 6.24.

Found: C, 76.2; H, 6.6; N, 2.52; Cl, 6.36.

EXAMPLE 6 endo-2-Benzilyloxy-exo-3-aminomethyl-bicyclo[2.2.1]heptane

A solution of 11.7 g. (0.02 mole) endo-2-benzilyloxy-exo-3(N,N-dibenzylaminomethyl)bicyclo[2.2.1]heptane hydrochloride, 200 ml. ethanol and 100 ml. water is reduced on a Parr hydrogenation apparatus at 60 psi. hydrogen at 40° C. in the presence of 0.2 g. 10 percent palladium on carbon catalyst until the uptake of hydrogen ceases. The catalyst is removed by filtration and the filtrates are evaporated under reduced pressure. The residues are dissolved in water, saturated with sodium bicarbonate and the base extracted into ether, dried and the solvents removed under reduced pressure. The residues are purified by recrystallization from normal heptane to yield endo-2-benzilyloxy-exo-3-aminomethyl-bicyclo[2.2.1]heptane, m.p. 123°–124° C.

Anal. Calcd. for $C_{22}H_{25}NO_3$: C, 75.1; H, 7.2; N, 4.0.

Found: C, 74.8; H, 7.3; N, 3.8.

EXAMPLE 7

1,7,7-Trimethyl-endo-2-benzilyloxy-endo-3(N,N-dimethylamino)-bicyclo[2.2.1]heptane hydrochloride A mixture consisting of 6.71 g. (0.034 mole) of d,l-β-N, N-dimethylaminoborneol and 1.63 g. (0.034 mole) 50 percent sodium hydride in 150 ml. dry toluene is stirred and refluxed for two hours. The reaction mixture is cooled to 35° C. and a solution of 9.06 g. (0.034 mole) α-chlorodiphenylacetyl chloride in 50 ml. dry toluene is added all at once, and the resulting mixture stirred at reflux for 3 hours. After cooling 60 ml. (5 percent) sodium bicarbonate solution is added with stirring, the toluene layer separated and washed with an additional 25 ml. of sodium bicarbonate solution. After drying over anhydrous potassium carbonate, the solution is filtered and evaporated under reduced pressure leaving 14.3 g. (103.0 percent) of an oily residue which is suspended in hot water and acidified with 6N aqueous hydrochloric acid. The aqueous acid is decanted from the gummy residues which crystallize when they are covered with ethyl acetate. The solids are collected by filtration and recrystallized from 75 ml. hot acetonitrile to yield 1,7,7-trimethyl-endo-2-benzilyloxy-endo-3(N,N-dimethylamino)bicyclo[2.2.1]heptane hydrochloride, m.p. 284°–285° C.

Anal Calcd. for $C_{26}H_{34}ClNO_3$: C, 70.33; H, 7.90; N, 3.15; O, 10.81.

Found: C, 70.7; H, 8.1; N, 3.17; O, 11.39.

I claim:

1. A compound selected from the group consisting of compounds of the formula

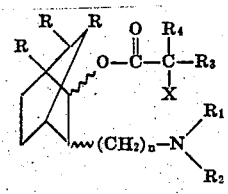

wherein R is hydrogen or methyl, $R_1$ and $R_2$ are hydrogen, lower alkyl, aryl and aralkyl, $R_3$ and $R_4$ are lower alkyl, cycloalkyl or aryl, X is hydrogen or hydroxyl and n is zero or one, and pharmaceutically acceptable salts thereof.

2. A compound of claim 1 in which $R_1$ and $R_2$ are lower alkyl.

3. A compound of claim 1 in which $R_1$ and $R_2$ are methyl.

4. A compound of claim 1 in which R is hydrogen and $R_3$ and $R_4$ are phenyl.

5. A compound of claim 1 in which $R_1$ and $R_2$ are lower alkyl and X is hydroxyl.

6. A compound of claim 1 in which $R_1$ and $R_2$ are lower alkyl, X is hydroxyl and $n$ is zero.

7. A compound of claim 1 in which R is methyl and $R_3$ and $R_4$ are phenyl.

8. A compound of claim 1 in which R is hydrogen.

9. 2-benzilyloxy-3(N,N-dimethylaminomethyl)bicyclo[2.2.1]heptane.

10. 2-benzilyloxy-3(N,N-dibenzylaminomethyl)bicyclo-[2.2.1]heptane.

11. 2-benzilyloxy-3-aminomethyl-bicyclo[2.2.1]heptane.

12. 1,7,7-trimethyl-2-benzilyloxy-3(N,N-dimethylamino)bicyclo[2.2.1]heptane.

13. The process which comprises reacting a compound of the formula

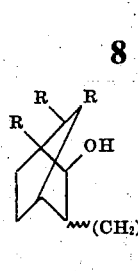

with a compound of the formula

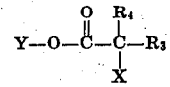

where Y is lower alkyl to form a compound of the formula

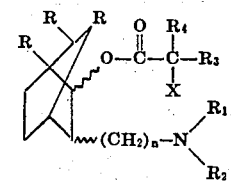

wherein R is hydrogen or methyl, $R_1$ and $R_2$ are hydrogen, lower alkyl, aryl and aralkyl, $R_3$ and $R_4$ are lower alkyl, cycloalkyl or aryl, X is hydrogen or hydroxyl and $n$ is zero or one.

14. The process of claim 13 in which R is hydrogen, $R_1$ and $R_2$ are methyl, $R_3$ and $R_4$ are phenyl and $n$ is zero.

15. The process of claim 13 in which Y is methyl and the process is carried out in an inert solvent in the presence of an alkaline catalyst.

16. The process which comprises treating 2-hydroxy-3-(N,N-dimethylaminomethyl)bicyclo[2.2.1]heptane with methyl benzilate in the presence of sodium methoxide to form 2-(benzilyloxy)-3(N,N-dimethylaminomethyl)bicyclo[2.2.1]heptane.

* * * * *